(12) United States Patent
Barnett

(10) Patent No.: US 10,392,860 B2
(45) Date of Patent: Aug. 27, 2019

(54) SYSTEMS AND METHODS FOR CONTROLLING THE BLINDS

(71) Applicant: Eric Barnett, Fort Worth, TX (US)

(72) Inventor: Eric Barnett, Fort Worth, TX (US)

( * ) Notice: Subject to any disclaimer, the term of this patent is extended or adjusted under 35 U.S.C. 154(b) by 0 days.

(21) Appl. No.: 15/067,306

(22) Filed: Mar. 11, 2016

(65) Prior Publication Data

US 2018/0030780 A1 Feb. 1, 2018

Related U.S. Application Data

(60) Provisional application No. 62/134,043, filed on Mar. 17, 2015.

(51) Int. Cl.
| | |
|---|---|
| E06B 9/307 | (2006.01) |
| E06B 9/322 | (2006.01) |
| E06B 9/36 | (2006.01) |
| F16H 1/06 | (2006.01) |
| G08C 17/02 | (2006.01) |
| E06B 9/68 | (2006.01) |

(52) U.S. Cl.
CPC .............. *E06B 9/322* (2013.01); *E06B 9/307* (2013.01); *E06B 9/364* (2013.01); *E06B 9/368* (2013.01); *F16H 1/06* (2013.01); *G08C 17/02* (2013.01); *E06B 2009/3222* (2013.01); *E06B 2009/6818* (2013.01); *G08C 2201/31* (2013.01)

(58) Field of Classification Search
CPC .......... E06B 9/322; E06B 9/364; E06B 9/368; E06B 9/307; E06B 2009/3222; E06B 2009/6818; E06B 2009/285; G08C 2201/31; G08C 2201/30

USPC .................................................. 160/168.1 P
See application file for complete search history.

(56) References Cited

U.S. PATENT DOCUMENTS

| | | | | |
|---|---|---|---|---|
| 4,096,903 | A * | 6/1978 | Ringle, III .............. | E06B 9/264 160/107 |
| 5,663,621 | A * | 9/1997 | Popat .................. | H04L 12/2803 318/480 |
| 5,760,558 | A * | 6/1998 | Popat ........................ | E06B 9/32 160/168.1 R |
| 6,057,658 | A * | 5/2000 | Kovach .................... | E06B 9/262 318/16 |
| 6,084,231 | A * | 7/2000 | Popat ........................ | E06B 9/32 250/214 AL |
| 6,181,089 | B1 * | 1/2001 | Kovach .................... | E06B 9/262 318/16 |
| 6,536,503 | B1 * | 3/2003 | Anderson ............... | E06B 9/262 160/170 |
| 6,945,302 | B2 * | 9/2005 | Nien ........................ | E06B 9/308 160/170 |
| 7,190,139 | B2 * | 3/2007 | Mommaerts ............ | E06B 9/307 318/445 |

(Continued)

*Primary Examiner* — Johnnie A. Shablack
(74) *Attorney, Agent, or Firm* — Eldredge Law Firm; Richard Eldredge

(57) ABSTRACT

The present invention provides a device to control the tilt angle of window blinds. The device is capable of working with existing home automation control systems. The device is configured to operate in one or more modes such as, a primary mode and a secondary mode. In the primary mode of operation of the device is controlled by the home automation controller using a wireless mesh network protocol or a home automation protocol. In the secondary mode, the device 604 is operate independent of the mesh network in a standalone manner.

8 Claims, 9 Drawing Sheets

(56) References Cited

U.S. PATENT DOCUMENTS

| | | | | |
|---|---|---|---|---|
| 7,315,146 B2* | 1/2008 | Bejean | | E06B 9/32 160/1 |
| 7,389,806 B2* | 6/2008 | Kates | | E06B 9/32 160/5 |
| 7,466,090 B2* | 12/2008 | Meewis | | E06B 9/322 160/166.1 |
| 8,091,604 B2* | 1/2012 | Kluck | | A47H 5/0325 160/1 |
| 8,120,292 B2* | 2/2012 | Berman | | E06B 9/322 318/280 |
| 8,508,169 B2* | 8/2013 | Zaharchuk | | E05F 17/00 160/5 |
| 8,525,462 B2* | 9/2013 | Berman | | E06B 9/322 318/286 |
| 8,643,465 B2* | 2/2014 | Fitzgibbon | | G07C 9/00182 340/5.2 |
| 8,723,454 B2* | 5/2014 | Skinner | | E06B 9/322 318/16 |
| 8,723,466 B2* | 5/2014 | Chambers | | E05F 15/79 160/166.1 |
| 8,820,388 B2* | 9/2014 | Mullet | | E06B 9/322 160/310 |
| 8,890,456 B2* | 11/2014 | Berman | | H04L 12/2827 318/468 |
| 8,939,190 B2* | 1/2015 | Mullet | | E06B 9/307 160/176.1 P |
| 9,085,931 B2* | 7/2015 | Ackermann | | E06B 9/322 |
| 9,118,220 B2* | 8/2015 | Lamb | | H02J 13/0086 |
| 9,261,752 B2* | 2/2016 | Moskowitz | | E06B 9/24 |
| 9,267,327 B2* | 2/2016 | Feldstein | | G05B 11/01 |
| 9,366,082 B2* | 6/2016 | Feldstein | | G05B 11/01 |
| 9,489,834 B2* | 11/2016 | Hall | | G01R 19/0092 |
| 9,506,288 B2* | 11/2016 | Hall | | F16H 1/20 |
| 9,540,871 B2* | 1/2017 | Hall | | F16H 1/20 |
| 9,605,476 B2* | 3/2017 | Hall | | F16H 1/20 |
| 9,605,478 B2* | 3/2017 | Adams | | E06B 9/32 |
| 9,644,424 B2* | 5/2017 | Slivka | | E06B 9/72 |
| 9,652,977 B2* | 5/2017 | Hall | | G08C 17/02 |
| 9,657,516 B2* | 5/2017 | Graybar | | E06B 39/70 |
| 9,834,983 B1* | 12/2017 | Hall | | E06B 9/307 |
| 9,834,984 B2* | 12/2017 | Fiedler | | E06B 9/32 |
| 9,869,124 B2* | 1/2018 | Hall | | E06B 9/307 |
| 9,938,765 B2* | 4/2018 | Berman | | F24F 11/62 |
| 2005/0035854 A1* | 2/2005 | Gupta | | A61B 5/0062 340/531 |
| 2009/0125148 A1* | 5/2009 | Koot | | G05B 19/042 700/275 |
| 2009/0206983 A1* | 8/2009 | Knode | | G08C 17/02 340/3.7 |
| 2009/0308543 A1* | 12/2009 | Kates | | E06B 9/44 160/5 |
| 2010/0033121 A1* | 2/2010 | Dill | | E06B 9/32 318/484 |
| 2012/0073765 A1* | 3/2012 | Hontz | | E06B 9/304 160/84.02 |
| 2012/0125543 A1* | 5/2012 | Chambers | | E06B 9/304 160/5 |
| 2012/0261078 A1* | 10/2012 | Adams | | E06B 39/32 160/6 |
| 2013/0269887 A1* | 10/2013 | Skinner | | E06B 9/322 160/331 |
| 2014/0262077 A1* | 9/2014 | Watkins | | E06B 9/68 160/310 |
| 2014/0376747 A1* | 12/2014 | Mullet | | G08C 23/00 381/110 |
| 2015/0136342 A1* | 5/2015 | Clements | | A47H 1/14 160/368.1 |
| 2016/0010388 A1* | 1/2016 | Lagarde | | E06B 9/304 160/176.1 P |
| 2016/0102494 A1* | 4/2016 | Clements | | A47H 1/14 160/309 |
| 2016/0177566 A1* | 6/2016 | Trevia | | A63J 11/00 160/1 |
| 2016/0201388 A1* | 7/2016 | Wen | | E06B 9/307 160/176.1 P |
| 2017/0081917 A1* | 3/2017 | Brunk | | E06B 9/72 |
| 2017/0095103 A1* | 4/2017 | Pham | | A47H 5/0325 |
| 2017/0234066 A1* | 8/2017 | Graybar | | E06B 9/322 475/149 |
| 2017/0260806 A1* | 9/2017 | Adams | | E06B 9/32 |
| 2017/0260808 A1* | 9/2017 | Adams | | E06B 9/72 |
| 2017/0275946 A1* | 9/2017 | Hall | | E06B 9/72 |
| 2017/0362893 A1* | 12/2017 | Lundy | | E06B 9/32 |
| 2017/0364395 A1* | 12/2017 | Shrivastava | | G05B 15/02 |
| 2018/0014386 A1* | 1/2018 | Bhutani | | H05B 37/0272 |

* cited by examiner

SYSTEMS AND METHODS FOR CONTROLLING THE BLINDS

CROSS REFERENCE TO RELATED APPLICATION

This application claims priority to and the benefit of U.S. Provisional Patent Application No. 62/134,043, filed Mar. 17, 2015 and titled "BLIND CONTROLLER"; the disclosure of which is incorporated herein by reference inits entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

TECHNICAL FIELD

The present disclosure relates to device for controlling window blinds

BACKGROUND

Window blinds are used in homes to control inlet of sunlight to homes. A conventional window blind system includes a headrail that is fixed at top of the window. Further, the window blind system includes a blind assembly suspended from the head rail. The angle of the blinds can be controlled by application of an external force in order to tilt the window blinds that changes the amount of sunlight entering the home through the window.

Various types of mechanisms are available to lift or change the tilt angle of the window blinds. Some window blind systems may have a visible lift cord and tilt cord to change the tilt angles of the window blinds. In such window blind systems, lift and tilt cords may be provided, suspended on right and left hand sides of the head rail that needs to be pulled or rotated to lift and change angles of the window blinds. Since, the lift cord and tilt cords are visible, it is accessible to children and can be pulled or stretched by them, while playing that may cause an accident.

There are other window blinds systems wherein, the tilt cord or lift cords are hidden and are not easily accessible or are concealed. In some window blind systems having concealed cords, there is provided a spring means to keep the blinds in balance and to hold the blinds and bottom rail in position after an adjustment of the blinds. There are other window blind systems known in the market, with concealed cords, which uses a tension force of a positioning cord in order support the bottom rail in position after an adjustment of the window blinds. However, the use of spring is always prone to elastic fatigue. After some time of usage, when the elastic fatigue kicks in, the spring mechanism or the positioning cord system cannot support the bottom rail accurately in position. Also, majority of these designs are used for controlling the elevation of the blinds only. For controlling the tilt angle of the blinds, additional tilting rod and mechanism must be added to the already complex window blind system. Since, the lifting and tilting angle of the blinds is separately controlled.

There are also automatic systems that are available in the market to control the opening and tilt angle of the window blinds. However, such systems need to be separately integrated with control systems like new wiring, network etc. Also, it requires an additional controller system to be installed. This means that there is an extra controller installed within a home to control blinds in case it already has some home automation system pre-installed.

Unfortunately, when it comes to controlling horizontal blinds no product is on the market that directly operates with existing home automation systems using a wireless mesh network protocol. End users are required to use hand held RF remote, a custom smart phone application or custom tablet application to control their window blinds. This limitation forces users to have multiple interfaces to control automation devices in the home. To solve this problem for window blinds we invented the motorized device for controlling horizontal window blinds tilt. The device's unique feature is the ability to integrate and work with home automation wireless mesh protocols without the need to add a costly network connection bridge between the window blind controlling device and the home automation network. This unique feature allows the end user to control their window blinds and many of their home automation devices with a single interface. This unique feature also allows the motorized device to interact with other home automation devices such as network connected sensors.

Therefore, there exists a need for an improved window blind control system to efficiently control the blinds.

SUMMARY

The present invention comprises a device for controlling tilt angle of window blinds having one or more of the features recited in the appended claims and/or one or more of the following features, which alone or in any combination may comprise patentable subject matter:

Accordingly, in an embodiment of the invention, there is provided a device for controlling tilt angle of window blinds. The device includes a housing unit. The housing unit, further includes at least one motor unit. The motor unit is further connected to at least one gear unit that is configured to be rotated by the at least one motor unit. The housing further includes at least one hollow drive shaft, coupled to the at least one gear unit. The at least one hollow drive shaft is configured to pass through the full length of the housing unit and encases a window blind tilt rod. This at least one hollow drive shaft is rotated by the at least one gear unit which is rotated by the at least one motor unit. The housing further includes an electronic circuit that provides control of the device. The electronic circuit, further includes a transceiving unit that is configured to communicate with other devices in a predefined area.

In another embodiment, the housing unit is a member of a device network, allowing it to communicate with other network devices by using a centralized controller.

In yet another embodiment, the housing unit associates with another specific device, allowing them to communicate directly without the need for the centralized controller. This association of the housing unit with another device is a direct association or assigned association. The direct association is the simplest form of associating Z-Wave or mesh devices where a source node (when the housing unit set to "association set mode") receive the identity code of a target node (another device) and get associated together.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

DETAILED DESCRIPTION

Figure 1:
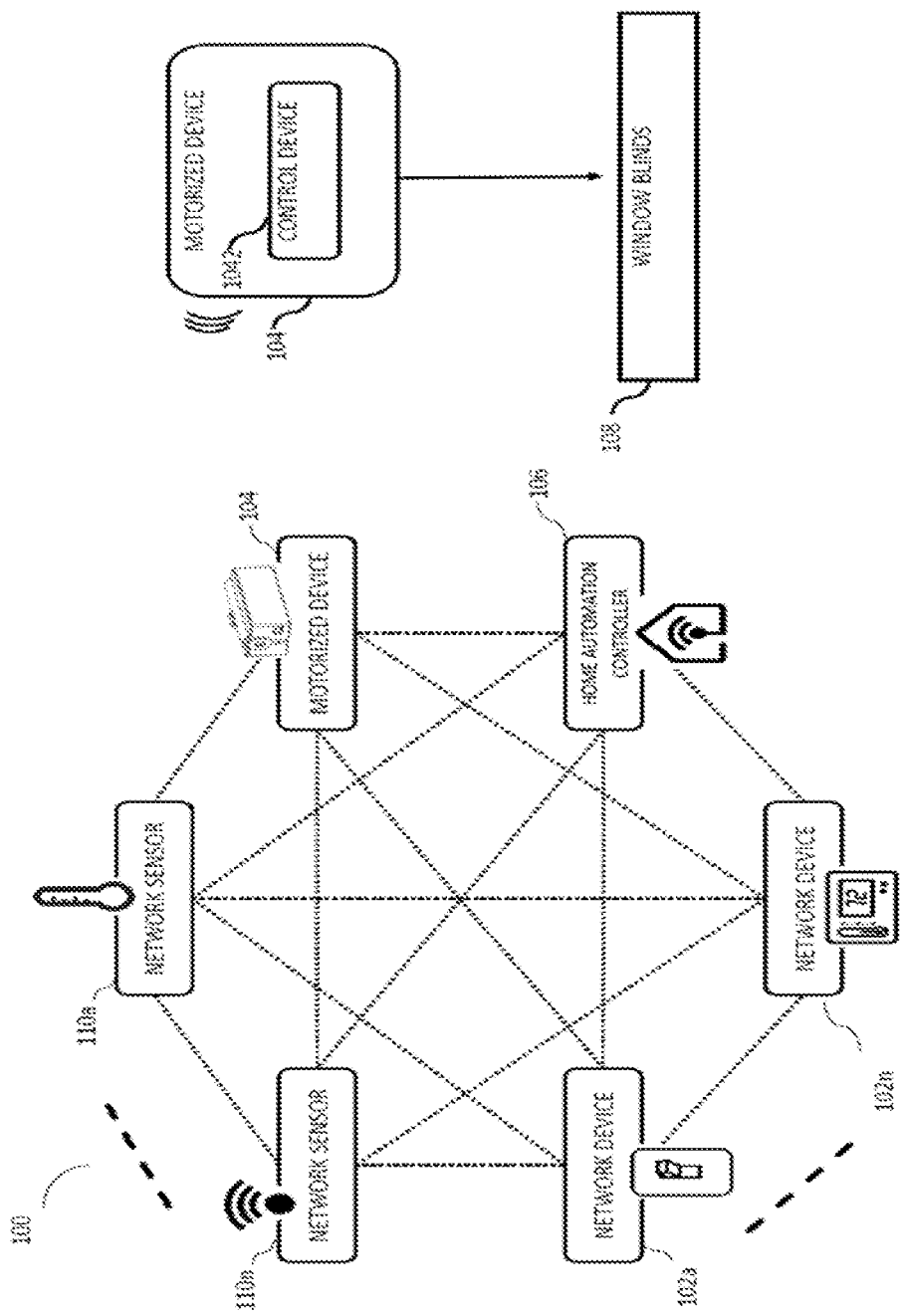
FIG. 1 illustrates a block diagram depicting an environment where various embodiments of the present invention can function.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Referring now to FIG. I, a line diagram depicting an environment 100 where various embodiments of the invention. The environment 100 includes a plurality of networked devices 102A-102N, a home automation controller 106, a device 104 coupled to window blinds 108 and a plurality of network sensors HOA-HON. The network devices 102A-102N, the home automation controller 106, the network sensors HOA-HON, and the device 104 are connected to each other wirelessly to form a home automation wireless mesh network. The network devices 102A-102N, the network sensors HOA-HON, the home automation controller 106, and the device 104 are capable of communicating with each other. The network sensors HOA-HON can either connect directly with the home automation controller 106 to send sensed data to the device 104 or can connect with the home automation controller by relaying the sensed signal in a hopping manner. That means that the sensed data signals can be sent from one networked device 102A to other network device 102B and then finally to the home automation controller 106 which in turn controls the device 200. The window blinds 108 may be mini blinds, shutters, shades, venetian blinds (2" and 2 Y2 horizontal blinds) and curtains. Examples of the home automation controller 106 may include, such as, but not limited to, Wink Hub, Smart Things Hub, and so forth. The network devices 102A-102N may include an application for communicating with other devices present in the network. Further, each of the devices 102A-102N, 104, 106, and so forth present in the network has an associated unique identifier.

The devices 102A-102N, the device 104, the home automation controller 106 may communicate with each other via a wireless mesh protocol. Examples of the wireless mesh network protocol may include, but are not limited to, Bluetooth MESH, Radio Frequency (RF) control, Z-Wave, ZigBee, FabFi, SolarMesh, WING, Wireless Backhaul (Wi-BACK) and so forth. Wireless mesh control network has been explored for working of this invention as it has many intrinsic advantages. One of the main advantages of such a network is that the devices to be controlled need not be placed near the home automation controller. The device to be controlled can be accessed by relaying control signals from other network devices connected to the same home automation controller.

Further, the device 104 is configured to operate in one or more modes such as, a primary mode and a secondary mode. In the primary mode of operation of the device 104, the control device 1042 is controlled by the home automation controller 106 using a wireless mesh network protocol or a home automation protocol.

In another mode of operation, the device 104 may control the window blinds 108 based on change in temperature in the environment surrounding the device 104 or the window blinds 108. In further mode of operation, the window blinds 108 may be controlled by the device 104 based on time. For example, the control device 1042 may open or close the window blinds 108 based on the time of a day or night. For example, the control device 1042 may close the window blinds 108 at 3 PM. In some embodiments, the time related information may be entered by a user to a user interface provided on the home automation controller 106.

In yet another mode of operation, the device 104 or the control device 1042 may control the opening and closing of the window blinds 108 based on a position of the network devices 102A-102N such as a mobile phone of the user, a smart watch, a laptop, and so forth. For example, the network sensors 110A-110N interfacing the device 104 may sense when the network device 102A-102N approaches the device 104 or is within a predefined area nearby the network sensors 110A-110N interfacing the device 104, and the opening and closing of the window blinds 108 may be controlled accordingly. The control device 1042 may also control the window blinds 108 at a site using a proximity detection of a mobile device or the network device 102A-102N, which may be based upon the detection of a number of zones. Each of the zones may be associated with a predefined temperature threshold of a thermostat or the control device 1042 included in the device 104 or other energy consuming device. Further, the temperature threshold corresponding to a zone may be different from the temperature thresholds corresponding with each of the other zones. A database of the home automation controller 106 may store multiple values such as, a position threshold, a plurality of temperature thresholds, a plurality of time values, a plurality of voice commands. The user may control the window blinds 108 by giving voice commands. The device 104 may be configured to receive the voice commands from the home automation controller 106 and process them based on comparison of pre-stored voice commands for controlling the opening and closing of the window blinds 108.

In another mode of operation, the device 104 may control the window blinds 108 based on a sunrise a sunset schedule. This mode of operation can be coupled by providing interfacing of the device 104 with a plurality of network connected photo-sensors. The photo-sensors sense the absence or presence of sunlight using the photoelectric receiver. The device 104 may be configured to receive the network connected photo-electric receiver commands from the home automation controller 106 and process them based on the pre-stored instructions for controlling the opening and closing of the window blinds 108.

In an embodiment of the invention, the device 104 may be interfaced with network sensors 110A-110N such as, a temperature sensor for sensing temperature of a site or zone.

In another embodiment, the device 104 is a member of network, allowing it to communicate with other devices on the same network by using a centralized controller.

In yet another embodiment, the device 104 associates with another specific device, allowing the specific device to communicate directly without the need for the centralized controller. This association of the device 104 with the specific device is a direct association or assigned association. The direct association is the simplest form of associating Z-Wave or mesh devices where a source node (when the housing unit set to "association set mode") receive the identity code of a target node (another device) and get associated together. The assigned associations allow the housing unit to connect with another network or mesh network devices that are not "in range" with the help of a controller with knowledge of the complete network and its routes.

Further, associating the source node (the housing unit) with the target node (another device in mesh network) directly, enables them to send signals directly without involving the central controller. This saves time, reduces the complexity of the communication and the amount of airtime taken. It also allows sensors to be used in networks without a static controller.

In yet another embodiment of the invention, there may be an input device connected to the device 104 like mobile phone of the user, a smart watch, a laptop, and so forth. Through these devices, a user can control the device 104 for tilting of the window blinds.

Figure 2A:
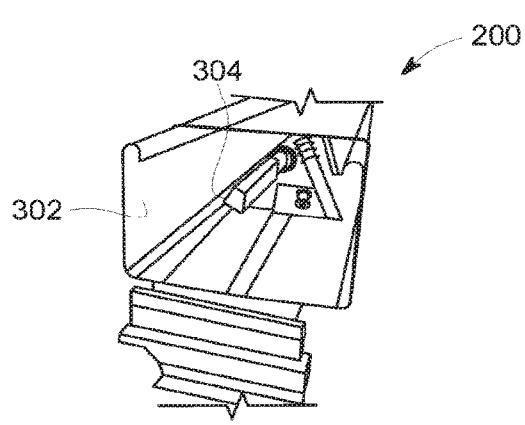
FIG. 2A illustrates a line diagram depicting perspective view of a device and a tilt rod of a D-shape, in accordance to an embodiment of the invention.
Figure 2B:
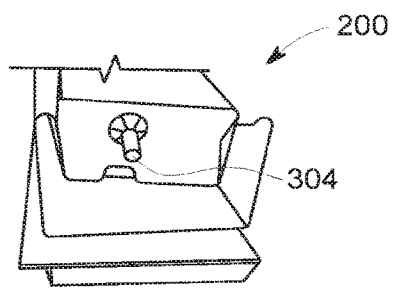
FIG. 2B illustrates a line diagram depicting transparent view of the device and a tilt rod of hexagonal shape, in accordance to an embodiment of the invention.
Figure 2C:
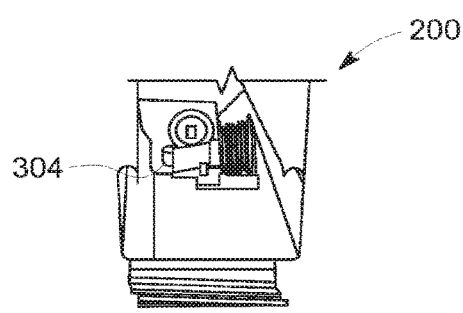
FIG. 2C illustrates a line diagram depicting the device and a tilt rod of 4 mm square shape, in accordance to an embodiment of the invention.
Figure 2D:
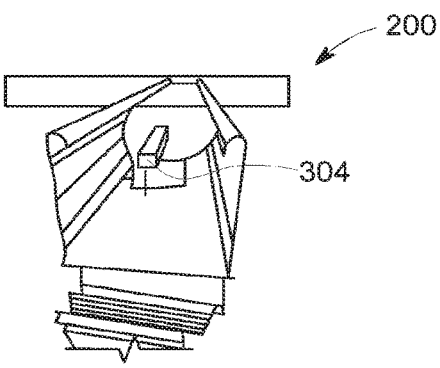
FIG. 2D illustrates a line diagram depicting the device and a tilt rod of ¼" square shape without adapter, in accordance to an embodiment of the invention.

Now, referring to FIGS. 2A-2E, various diagrams depicting perspective view of the device 209 or portions thereof, for controlling tilt angle of window blinds. As shown in FIGS. 2A-2D, the device 200 includes a tilt rod 304 for controlling tilt angle of window blinds, described in details with respect to FIG. 3. In FIG. 2A, the device 200 with the tilt rod 304 of a D-shape is illustrated. Further, FIG. 2B illustrates the device 200 and the tilt rod 304 of hexagonal shape. FIG. 2C illustrates a line diagram depicting the device 200 and the tilt rod 304 of 4 mm square shape. FIG. 2D illustrates a line diagram depicting the device 200 and a tilt rod 304 of ¼" square shape without adapter. Device 200 and 104 are similar devices and will be therefore used interchangeable with each other in the description. The device 200 is configured to be fitted into any existing horizontal window blind system. Also, the device 200 is so configured that it can work with any existing home automation controller installed within a home.

Figure 2E:
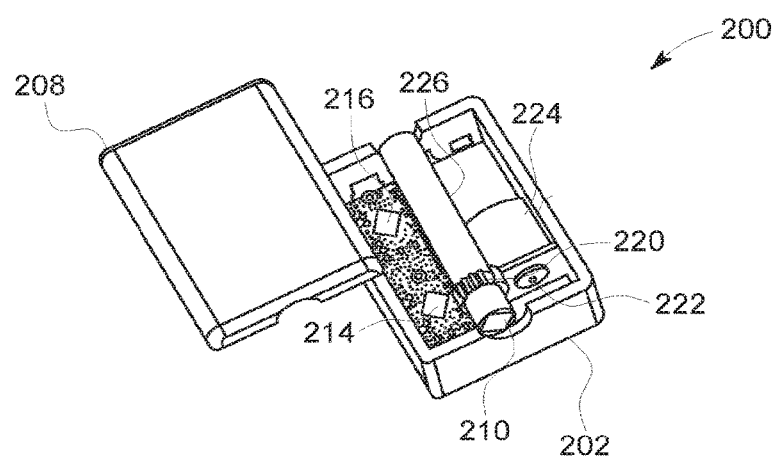
FIG. 2E illustrates internal portion of the device, in accordance to an embodiment of the inventions.

Further, as depicted in FIG. 2E, the device 200 includes a housing 202 that encloses various parts of the device 200. The housing 202 may be made up of anyone of a plastic, a metal, or a fiber. The housing 202 may further include a top lid 208 that may be opened to access internal parts of the device 200. The device 200, further includes a tilt rod receiving opening 210 that is present on both sides of the device 200.

Further referring to FIG. 2E, a line diagram depicting transparent view of the device 200. In this view, internal parts of the device 200 are visible. The device 200 includes a motor 224. In an embodiment of the invention, the motor 224 cis a Direct Current (DC) motor. Examples of the DC motor may include, but are not limited to, a DC brush motor, a stepper motor, etc. The motor 224 is placed inside the device 200. Further, at least one gear unit 220 is configured to be rotated by the motor 224. The housing further includes at least one hollow dive shaft 226, coupled to the at least one gear unit 220. The at least one hollow drive shaft 226 is configured to pass through the full length of the housing unit and partially encases the window blind tilt rod 304. This at least one hollow drive shaft 226 is rotated by the at least one gear unit 220 which is rotated by the motor 224. The motor 224 rotates the hollow drive shaft 226. The hollow drive shaft 226 is placed in a manner wherein, the hollow drive shaft 226 passes through a full length of the housing 202 of the device 200. The hollow drive shaft 226 further encases a window tilt rod of the window blinds. The hollow drive shaft 226 is turned by the motor 224, which in turn moves the window blind tilt to change the tilt angle of the window blinds.

In an embodiment of the invention, the device 200, further includes an electronic circuit (not shown in figure) that helps in controlling of the device 200 through the wireless home controller to which, the device 200 may be connected via the wireless mesh network. The electronic circuit, may further include a transceiving unit (not shown in figure) that helps the device 200 to communicate with other devices like existing wireless home controller through wireless communication. The communication can be through a home automation wireless mesh protocol wherein the protocol is chosen from a group comprising a ZigBee protocol, Bluetooth MESH, Thread, FabFi, Solar mesh, WING, Wireless Backhaul, and a Z-wave protocol. A person ordinarily skilled in the art will appreciate that for the purposes of illustrating the disclosed invention, the ZigBee standard—ZigBee Home Automation Public Application Profile has been used. Further, the disclosed invention may be implemented using any other suitable existing mesh network standard. Examples of the wireless mesh network protocol may include, but are not limited to, Bluetooth MESH, Radio Frequency (RF) control, Z-Wave, ZigBee, Thread, FabFi, SolarMesh, WING, Wireless Backhaul (WiBACK) and so forth. The motorized device for control of horizontal window blinds tilt position is not limited to the specific methods described by the Z-Wave standard. The invention can be adapted or scaled to use other home automation mesh network profile standards such as, but not limited to, those defined by Z-wave.

To store configuration data and settings a microprocessor, present within the electronic circuit, interfaces with a memory component. The memory component stores the open and close limit information, the device's unique identifier and the required feature and attributes data. The data stored in the memory component is used by the microprocessor code to control the motor 224.

Figure 3:
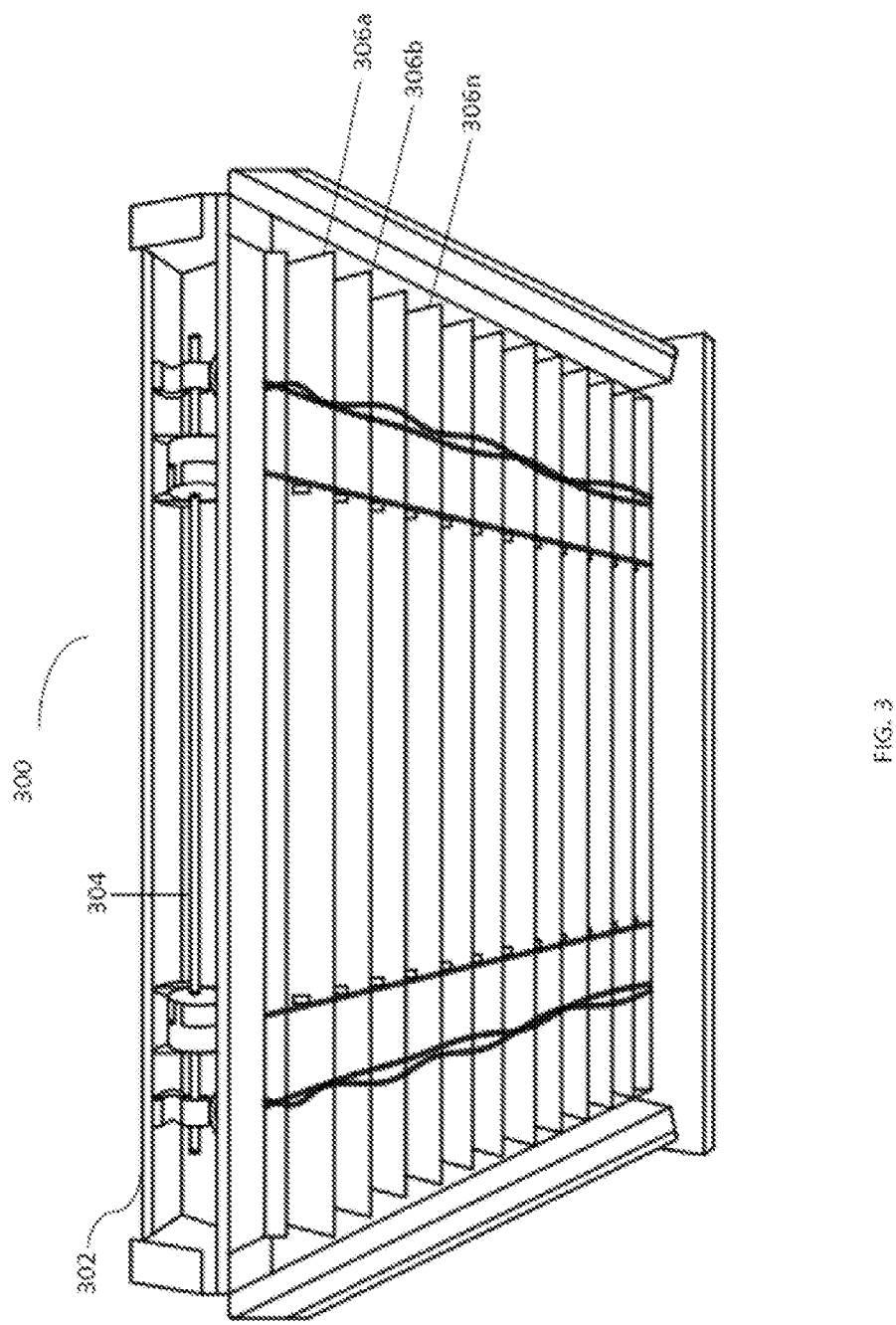
FIG. 3 illustrates a line diagram depicting top view of the window blind system where the device is to be placed, in accordance with an embodiment of the invention.

Now referring to FIG. 3, a line diagram depicting an existing window blinds system 300. The window blinds system 300 is a horizontal slat system wherein blinds 306a-306n are arranged horizontally. The window blinds system 300 further includes a headrail 302 that houses a window tilt arrangement. The window tilt arrangement includes a window tilt rod 304 placed horizontally within the headrail 302 in order to change tilt angle of the blinds 306a-306n. The device 200 needs to be placed within the headrail 302. Also, the window tilt rod 304 passes through the hollow drive shaft 226 placed within the device 200. The window tilt rod 304 is received by the hollow drive shaft 226 of the device through the tilt rod receiving openings 210. In an embodiment of the invention, the window tilt rod 304 may be either of hexagonal configuration or square configuration.

Figure 4:
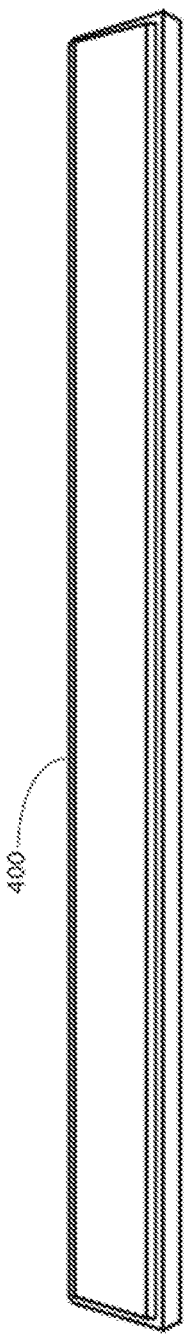
FIG. 4 illustrates a line diagram depicting a solar cell to be used with the device, in accordance to an embodiment of the invention.

Now referring to FIG. 4, a line diagram that illustrates a solar panel 400 that may be utilized by the device 200 to function as auxiliary power. The solar panel 400 can be suspended from the headrail 302 towards a light exposed side in order to charge-up the rechargeable battery during the day.

Figure 5:
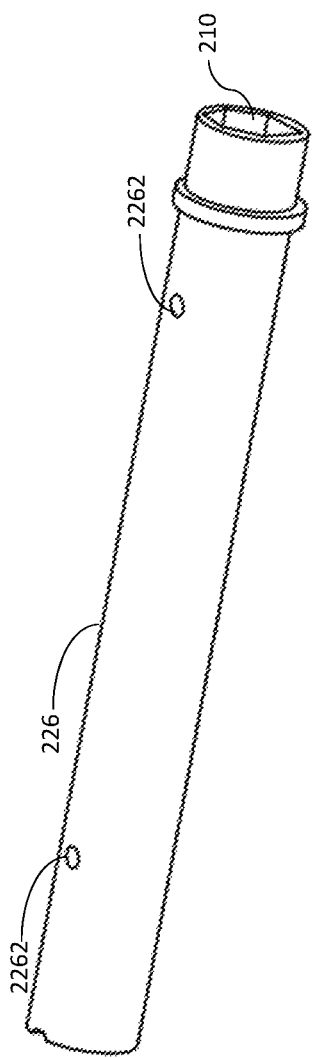
FIG. 5 illustrates a line diagram depicting a hollow shaft drive, in accordance to an embodiment of the invention.

FIG. 5C, depicts the hollow drive shaft 226 in perspective view. The hollow drive shaft 226 as displayed and discussed above includes two tilt rod receiving openings 210 on both sides to receive the window tilt rod 304.

Figure 6:
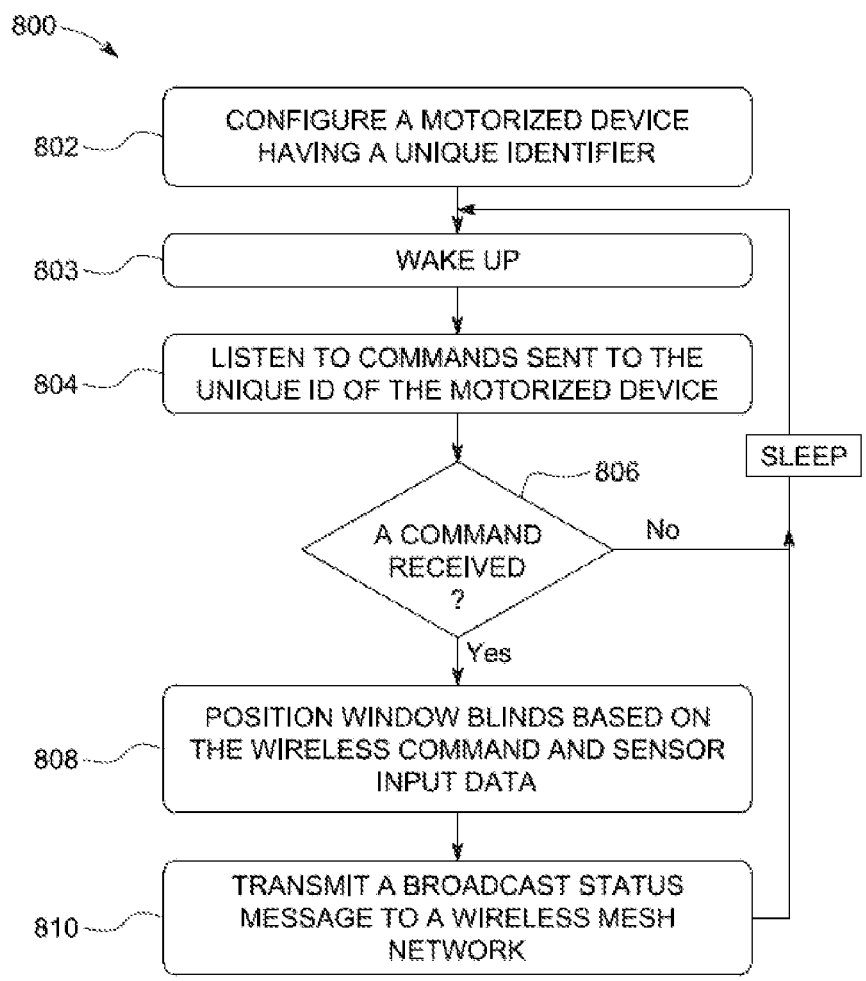
FIG. 6 illustrates a flow chart depicting an operational mode of the device, in accordance to an embodiment of the invention.

Now referring to FIG. 6, a flow chart illustrating a method 800 of primary operation mode (as discussed above) of the device 200. The method 800 starts at step 802 wherein the device 200 is checked for configuration when it is switched on. If the device is not configured, a series of functions are performed to determine the tilt up and tilt down limits for the blinds (as discussed above). During this configuration, the device 200 also joins the wireless home automation mesh network (or the wireless mesh network) using the device 200 unique identifier and a pairing routine. The device 200 follows the strict process that is built around the exchange of security keys. The Home Automation Controller controls the keys and will allow or not allow unauthorized devices to join the mesh network. After the configuration functions, have been successfully completed the system stores the data in memory of the device 200. Hereinafter, the home automation mesh network and the wireless mesh network are used interchangeably without any change in its meaning or function. When the configuration is complete, at step 803, the device 200 wakes up in time-period to check if any command has been received. This time-period may be once every second. This helps in saving battery life. Further at step 804, the device listens for commands sent to its unique id over the wireless mesh network.

Furthermore, at step 806, it is determined whether the command is received or not. If the command is not received, the device 200 sleeps for a time-period and wakes again listens for any command sent to it. However, if the command is received by the device 200, the position of the window blinds are adjusted at step 808. At step 810, upon completion of positioning the window blinds, the device 200 will transmit a broadcast status message to the wireless mesh network indicating its position and return to sleep before waking up to listen for new command.

Figure 7:
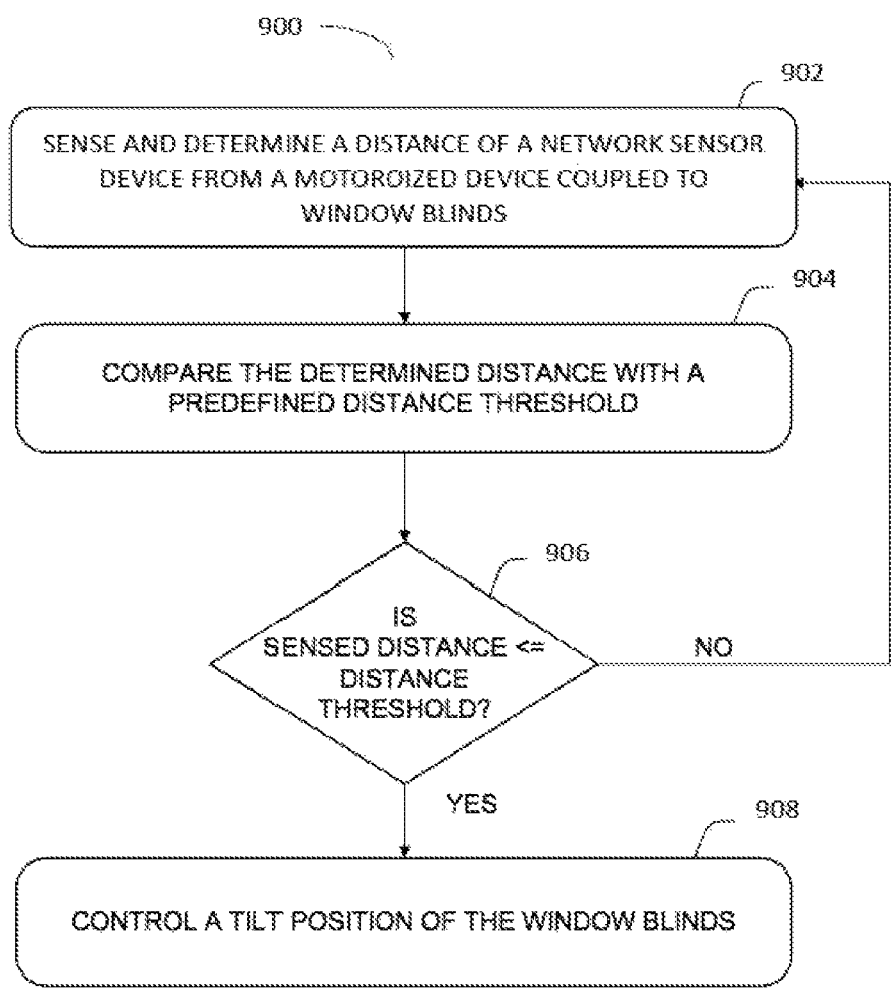
FIG. 7 illustrates a flow chart depicting control of tilt angle of the window blinds, in accordance to an embodiment of the invention.

Now referring to FIG. 7 illustrating a flow chart depicting a method 900, for changing tilt angle of window blinds based on distance sensor. The method 900 starts at step 902 wherein, the distance of any of the network device 102A-102N is sensed and determined from the device 200 installed in the window blinds system by any of the network sensors 110A-110N. The network sensors 110A-110N, as described above, may include position sensor, proximity detection sensor etc. In some embodiments, a distance sensor of the device 104 determines the distance of the network device 102A-102N from the device 104 when the network sensors 110A-110N detects that the network device 102A-102N has entered in a zone of the device 104. At step 904, the control device 1042 may compare the determined distance with a predefined distance threshold. The network sensors 110A-110N are configured with a user interface so that a user can input various data for functioning of the device 200.

Then at step 906, it is checked whether the determined distance is less than or equal to the distance threshold value. If the distance is less or equal to distance threshold, that has been input by the user into the network sensors 110A-110N through the user interface, then step 908 is executed else step 902 is executed. Thereafter, at step 908, the control device 1042 may control a tilt position of the window blinds 306A-306N after receiving the tilt command from the network sensor 110A-110N.

Figure 8:
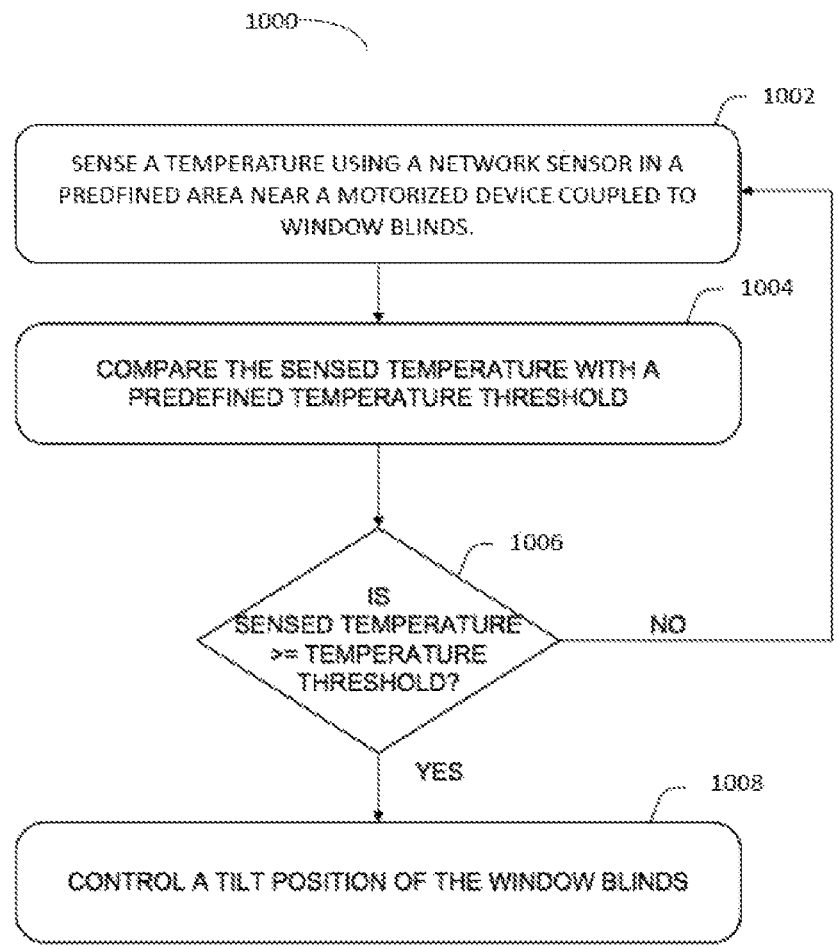
FIG. 8 illustrates a flow chart depicting control of tilt angle of the window blinds, in accordance to another embodiment of the invention.

Now referring to FIG. 8 illustrating a flow chart depicting a method 1000 to control tilt angle of window blinds 306A-306N. For this, the network sensors 110A-110N may include a temperature sensor for sensing temperature of a site or zone.

At step 1002, the temperature sensor may sense a temperature in an area near or around and inform the home automation controller 106. In some embodiments, the temperature sensor may sense the temperature of the site or zone. Then, at step 1004, the home automation controller 106 may compare the sensed temperature with a predefined temperature threshold stored in a database of the home automation controller 106. In some embodiments, the home automation controller may include a thermostat for sensing the temperature in a zone or area. At step 1006, it is checked whether the sensed temperature is equal to or more than the temperature threshold. When the temperature is less than the temperature threshold, then the control goes back to step 1002, else step 1008 is executed. At step 1008, the tilt position of the window blinds such as the window blinds 306A-306N are controlled as per the predefined instructions stored in database of the home automation controller 106. The predefined instructions may be like closing window blinds when the temperature exceeds the predefined temperature threshold i.e. 40 degree Celsius, and opening the window blinds at temperature 25 degree Celsius.

Figure 9:
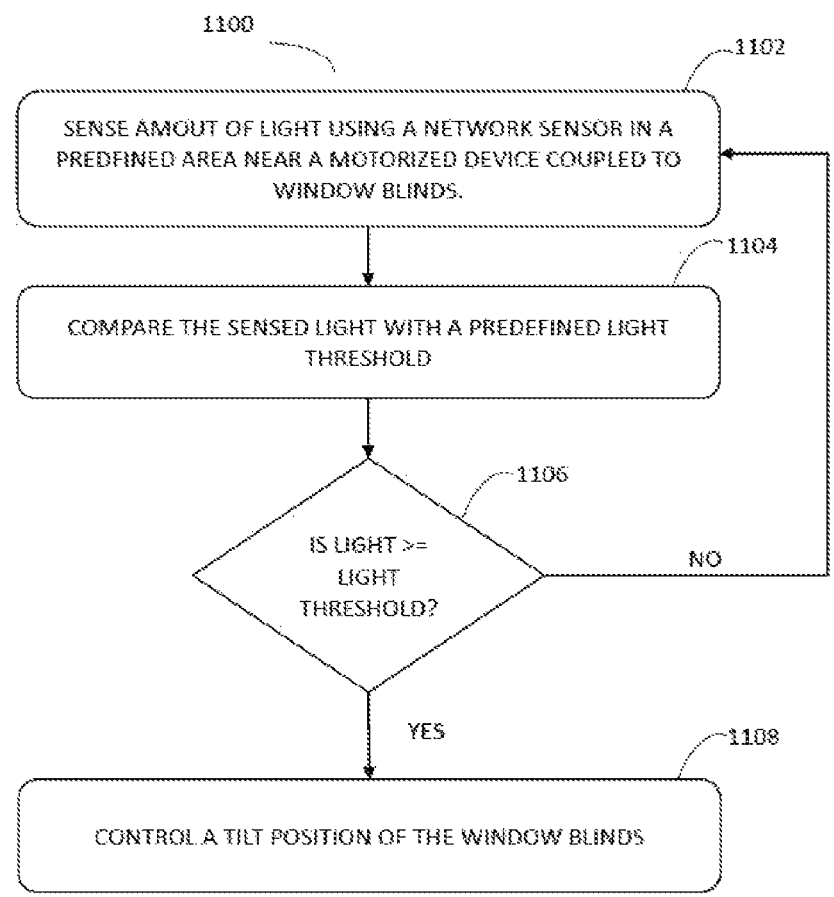
FIG. 9 illustrates a flow chart depicting control of tilt angle of the window blinds, in accordance to another embodiment of the invention.

Now referring to FIG. 9 illustrating a method 1100, to control tilt angle of window blinds 306A-306N by sensing ambient light value in a predefined region. The device 104 may receive instructions from the home automation controller 106 based on data from the network sensors 110A-110N such as, a photo-sensor for sensing sunlight of a site or zone.

At step 1102, the network connected photo-sensor may sense the sunlight in an area near or around the device 104 at regular intervals. In some embodiments, the photo-sensor may sense the sunlight of the site or zone. Then, at step 1104, the home automation controller 1064 may compare the sensed sunlight with a predefined sunlight threshold stored in a database. In some embodiments, the home automation controller 106 may include a thermostat for sensing the sunlight in a zone or area. At step 1106, it is checked whether the sensed sunlight is equal to or more than the sunlight threshold. When the sunlight is less than the sunlight threshold, then the control goes back to step 1102, else step 1108 is executed. At step 1108, the tilt position of the window blinds such as the window blinds 306A-306N are controlled as per the predefined instructions stored in the home automation controller 106.

The control device 1042 may tilt the window blinds to following positions based on value slider position or percentage value received: Open tilted up, Open titled fully (horizontal), Open tilted down, closed tilted up, closed tilted down, and so forth. In a specific embodiment, the window blinds can be tilted to an angle of any value falling between O and 99 percent wherein 0 percent signifies closed down, 50 percent signifies full open and 99 percent signifies closed while tilted up.

The control device 1042 may can send the blinds position or Open/Closed status to other devices such as the home appliances connected to a home automation mesh network.

Aspects of the present subject matter are described herein with reference to flowchart illustrations and/or block diagrams of methods and apparatus (systems) according to embodiments of the subject matter. It will be understood that each block of the flowchart illustrations and/or block diagrams, and combinations of blocks in the flowchart illustrations and/or block diagrams, can be implemented by computer readable program instructions.

While there has been shown, and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. A system for controlling tilt angle of window blinds comprising;
   a tilt angle controlling device, consisting of:
      a housing unit with a lid configured to secure to the housing unit;
      a motor unit housed within the housing unit;
      a gear unit operatively connected to the motor unit and configured to be rotated by the motor unit;
      a hollow drive shaft coupled to the gear unit, the hollow drive shaft extending and passing through a full length of the housing unit;
      a tilt rod receiving opening extending into the hollow drive shaft to receive a window blind tilt rod, the window blind tilt rod extending through the hollow drive shaft;
      wherein the hollow drive shaft is configured to be rotated by the gear unit to rotate the window blind tilt rod, and
      an electronic circuit unit with a transceiving unit within the housing unit and configured to receive control signals to activate the motor; and
   a home automation wireless mesh network configured to control the tilt angle controlling device via the electronic circuit unit to enable the tilt angle controlling device to be operated in one or more modes, the home automation wireless mesh network comprises a user device, a networked device, and the tilt angle controlling device with the electronic circuit; and
   the networked device configured to wirelessly communicate with the home automation wireless mesh network;
   a command transferred from the networked device to the tilt angle controlling device based on the networked device sensing a predetermined value of a parameter, the command providing predefined instructions to operate the tilt angle controlling device;

wherein the command is transferred exclusively through a home automation wireless mesh network protocol associated with the home automation wireless mesh network;

wherein the networked device is one of a home automation controller, temperature sensor; a photo-sensor configured to sense light; or a distance sensor configured to determine a distance between the user device and the tilt angle controlling device; and wherein the home automation wireless mesh network, in combination with the user device allows for wireless control of tilting of window blinds via the window blind tilt rod.

2. The system of claim 1, wherein the motor unit is a Direct Current (DC) motor.

3. The system of claim 1, wherein the electronic circuit controls the window blind tilt rod to control tilt angle of the window blinds.

4. The system of claim 1, wherein the home automation wireless mesh network is chosen from a group comprising a ZigBee protocol, Bluetooth MESH, Thread, FabFi, Solar mesh, WING, Wireless Backhaul, and a Z-wave protocol.

5. The system of claim 1, wherein the electronic circuit is coupled to the tilt angle controlling device to control the tilt angle controlling device to tilt the window blinds via the user device after either receiving an input from a user through a user interface of the user device, or receiving an input voice command through a user.

6. The system of claim 5, wherein the user device is any one of a smartphone, a computer, a laptop, a personal digital assistant, a smartwatch or a tablet computer.

7. The system of claim 1, wherein the parameter is a distance value and the predetermined value is a distance between the user device and the tilt angle controlling device such that the command is activated when the user device determines that the predetermined value is met.

8. The system of claim 1, wherein the parameter is a temperature value and the predetermined value is a temperature such that the command is activated when the networked device determines that the predetermined value is met.

* * * * *